United States Patent
Merassi et al.

(10) Patent No.: US 9,080,871 B2
(45) Date of Patent: Jul. 14, 2015

(54) MICROELECTROMECHANICAL SENSOR WITH NON-CONDUCTIVE SENSING MASS, AND METHOD OF SENSING THROUGH A MICROELECTROMECHANICAL SENSOR

(75) Inventors: Angelo Antonio Merassi, Caponago (IT); Biagio De Masi, Corsano (IT); Alberto Corigliano, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 323 days.

(21) Appl. No.: 13/612,583

(22) Filed: Sep. 12, 2012

(65) Prior Publication Data
US 2013/0081466 A1    Apr. 4, 2013

(30) Foreign Application Priority Data

Sep. 30, 2011 (IT) ................ TO2011A0874
Oct. 3, 2011 (IT) ................ TO2011A0881

(51) Int. Cl.
*G01C 19/56* (2012.01)
*G01P 15/125* (2006.01)
*G01C 19/5762* (2012.01)
*G01C 19/5755* (2012.01)

(52) U.S. Cl.
CPC ........ *G01C 19/5762* (2013.01); *G01C 19/5755* (2013.01); *G01P 15/125* (2013.01)

(58) Field of Classification Search
CPC ... G01P 15/125; G01P 15/0802; G01P 15/12; G01P 1/006; G01C 19/5762; G01C 19/5726; G01C 19/5719

USPC ........... 73/504.12, 504.14, 504.04, 514.32, 73/514.38, 514.36

See application file for complete search history.

(56) References Cited

U.S. PATENT DOCUMENTS

| | | | |
|---|---|---|---|
| 5,602,411 A | | 2/1997 | Zettler |
| 5,631,422 A | * | 5/1997 | Sulzberger et al. ......... 73/514.32 |
| 6,190,571 B1 | * | 2/2001 | Kato .................................. 216/2 |
| 7,267,006 B2 | * | 9/2007 | Malvern ..................... 73/514.32 |
| 2005/0081632 A1 | * | 4/2005 | Malvern et al. ............ 73/514.12 |
| 2008/0190199 A1 | * | 8/2008 | Prandi et al. ............... 73/504.12 |
| 2011/0005319 A1 | | 1/2011 | Huang |
| 2011/0219876 A1 | * | 9/2011 | Kalnitsky et al. .......... 73/514.32 |

FOREIGN PATENT DOCUMENTS

| | | |
|---|---|---|
| EP | 0928959 A2 | 7/1999 |
| WO | 2004/086056 A2 | 10/2004 |

* cited by examiner

*Primary Examiner* — Helen Kwok
(74) *Attorney, Agent, or Firm* — Seed IP Law Group PLLC

(57) ABSTRACT

A microelectromechanical sensor includes: a supporting structure, having at least one first electrode and one second electrode, which form a capacitor; and a sensing mass made of non-conductive material, which is arranged so as to interact with an electric field associated to the capacitor and is movable with respect to the supporting structure according to a degree of freedom so that a relative position of the sensing mass with respect to the first electrode and to the second electrode is variable in response to external stresses. The sensing mass is made of a material selected in the group consisting of: intrinsic semiconductor materials, oxides of semiconductor materials, and nitrides of semiconductor materials.

24 Claims, 4 Drawing Sheets

MICROELECTROMECHANICAL SENSOR WITH NON-CONDUCTIVE SENSING MASS, AND METHOD OF SENSING THROUGH A MICROELECTROMECHANICAL SENSOR

BACKGROUND

1. Technical Field

The present disclosure relates to a microelectromechanical sensor with a non-conductive sensing mass and to a method of sensing through a microelectromechanical sensor.

2. Description of the Related Art

Known to the art are microelectromechanical sensors of various types, which exploit the relative displacements of a movable mass with respect to a supporting structure. Sensors of this type are spreading to an ever-increasing extent in numerous apparatuses and may comprise, for example, accelerometers, gyroscopes, and electro-acoustic transducers (microphones/loudspeakers).

The displacements of the movable mass are determined by variations of the quantity that is to be measured. In the case of an accelerometer, for example, forces applied to the supporting structure modify its state of motion and cause relative displacements of the movable mass. In gyroscopes, the movable mass, kept in controlled oscillation, displaces as a result of the Coriolis acceleration due to rotations of the supporting structure.

In electro-acoustic transducers, the movable mass is in the form of a membrane that undergoes deformation in response to incident acoustic waves.

Consequently, from the amount of the displacement of the movable mass, it is possible to derive the value of the quantity that has caused it.

In many sensors, the movable mass is capacitively coupled to the supporting structure, and the capacitive coupling is variable in proportion to the position of the movable mass itself. From the information on the capacitive coupling, which can be easily obtained at electrical terminals, the quantity to be measured is derived.

According to widely adopted solutions, the supporting structure and the movable mass have respective mutually facing conductive electrodes so as to form capacitors. The capacitances of the capacitors are determined by the distance between the electrodes of the supporting structure and the electrodes of the movable mass and hence depend upon the position of the latter. Between the electrodes generally air is present.

Notwithstanding the wide range of applications, there are, however, some aspects that limit the performance and, sometimes, the possibility of use of capacitive sensors of this type.

The most critical aspects, which are frequently in conflict, are in general the sensitivity and the linearity of the sensors. The sensitivity, defined as derivative of the capacitance with respect to the position in the sensing direction, basically depends upon the geometry of the sensor (surfaces of the electrodes and distance at rest) and upon the stiffness of the suspension elements that connect the movable mass to the supporting structure to enable elastic oscillations with respect to pre-determined degrees of freedom or else upon the stiffness of the membrane in the case of electro-acoustic transducers. In particular, stiffer springs or membranes enable displacements of modest proportions and, consequently, small capacitive variations. If, on the one hand, the linearity benefits from small displacements from a resting position, on the other hand, however, the sensitivity is limited and this results in lower accuracy and robustness to noise. Less stiff elastic connections and membranes are to the advantage of sensitivity, but reduce the linearity. In addition, the risk of impact between the movable parts and the fixed parts, which may even cause irreversible damage to the devices, increases.

A further limit derives from the need to provide electrical connections both for the fixed electrodes and for the movable electrodes. The architecture of the microelectromechanical sensors is frequently complex, and providing numerous electrical connections may prove problematic.

There has been proposed the use of sensors that exploit capacitors, which are provided on the surface of a substrate and are biased, and a movable mass, which is made of polymeric material (for example parylene) and is set at a variable distance from the substrate. The movable mass, according to the position with respect to the surface of the substrate, modifies differently the lines of field at the edge of the capacitors and, consequently, their capacitance.

This solution presents, however, limitations because polymers, and in particular parylene, are far from suitable to create complex microstructures, as in many cases would be necessary, instead. The flexibility is consequently poor and the possibilities of use are rather limited.

BRIEF SUMMARY

The present disclosure is directed to a microelectromechanical sensor and a sensing method that will enable the limitations described above to be mitigated.

One embodiment of the present disclosure is directed to a microelectromechanical sensor that includes a supporting structure having a first electrode and a second electrode that is configured to form a capacitor with the first electrode. The sensor also includes a sensing mass of a non-conductive material, arranged to interact with an electric field associated with the capacitor and movable with respect to the supporting structure according to a degree of freedom, a relative position of the sensing mass with respect to the first electrode and to the second electrode being variable in response to an external stress. In one embodiment, the sensing mass is made of a material selected from the group consisting of intrinsic semiconductor materials, oxides of semiconductor materials, and nitrides of semiconductor materials.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
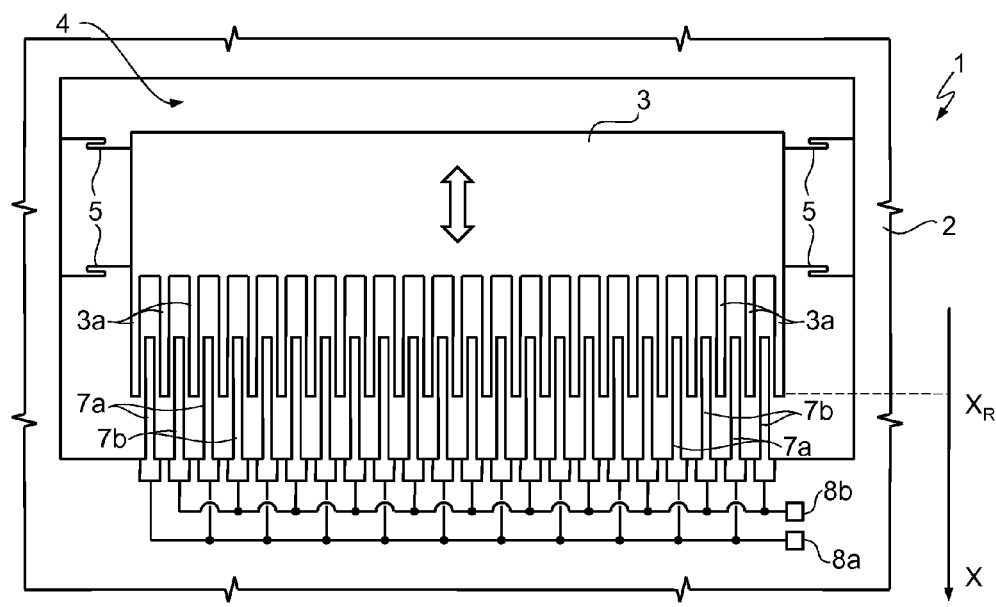
FIG. 1 is a simplified top plan view of a microelectromechanical sensor according to a first embodiment of the present disclosure.
Figure 2:
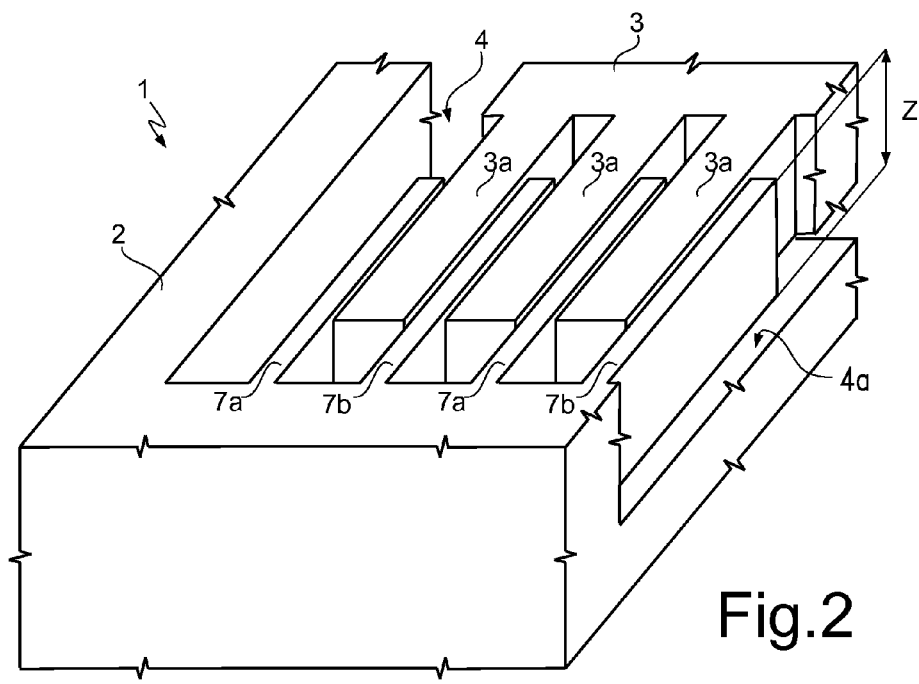
FIG. 2 is an enlarged perspective view of a detail of the microelectromechanical sensor of FIG. 1.

FIGS. 1 and 2 show in a simplified way a microelectromechanical sensor, in particular a monoaxial accelerometer, designated herein by the reference number 1.

The microelectromechanical sensor 1 comprises a supporting structure 2 made of semiconductor material, for example silicon, and a sensing mass 3, which is housed in a cavity 4 of the supporting structure 2 and is movable with respect to the supporting structure 2 itself according to a degree of freedom, which in the embodiment described, is of a translatory type. In practice, the sensing mass 3 is constrained to the supporting structure through elastic connection elements 5, which are configured to enable relative movements of the sensing mass 3 along a sensing axis X, with respect to a resting position. In the embodiment of FIGS. 1 and 2, the sensing axis X is moreover parallel to a bottom surface 4a of the cavity 4 in which the sensing mass 3 is housed. The sensing mass 3 is thus movable in a direction parallel to the surface 4a, which it faces.

The supporting structure 2 has a plurality of first electrodes 7a and second electrodes 7b made of doped semiconductor material (and hence conductive), which project towards the inside of the cavity 4. The first and second electrodes 7a, 7b are parallel to one another and to the sensing axis X, are arranged facing one another and alternated and are evenly spaced apart.

Moreover, adjacent first electrodes 7a and second electrodes 7b are electrically isolated from one another and define respective capacitors having plane and parallel plates. A first sensing terminal 8a and a second sensing terminal 8b are connected, respectively, to the first electrodes 7a and to the second electrodes 7b.

The movable mass 3 is made of non-conductive material, which, in the embodiment described herein, is intrinsic silicon. Alternatively, other intrinsic semiconductors may be used, such as germanium or gallium arsenide, or else oxides or nitrides of a semiconductor, such as, for example, silicon oxide ($SiO_2$) and silicon nitride ($Si_3N_4$). In general, however, intrinsic semiconductors are preferred for the higher dielectric constant, which, as will be seen hereinafter, favors the sensitivity of the devices.

As already mentioned, the sensing mass 3 is movable in the cavity 4 along the sensing axis X. The sensing mass 3 has moreover plates 3a that project laterally towards the first electrodes 7a and the second electrodes 7b, parallel to the sensing axis X and to the surface 4a. The plates 3a are arranged at a uniform distance apart and are each inserted between a respective pair of adjacent first electrodes 7a and second electrodes 7b.

The elastic connection elements 5 are configured so that, in the absence of external stresses, the sensing mass 3 is in a resting position $X_R$ with respect to the sensing axis X, as shown in FIG. 1. When a force is applied to the supporting structure 2, the sensing mass 3 moves along the sensing axis X with respect to the resting position $X_R$ in a direction determined by the sign of the stresses. The amplitude of the displacement is moreover determined by the amount of the stresses.

Consequently, the space comprised between pairs of adjacent first electrodes 7a and second electrodes 7b is occupied by a respective plate 3a of the sensing mass 3 to an extent determined by the position of the sensing mass 3 itself with respect to the sensing axis X.

As previously recalled, adjacent first electrodes 7a and second electrodes 7b define capacitors 10, the capacitance of which is determined, amongst other things, by the extension of the portion of the plates 3a inserted between adjacent first electrodes 7a and second electrodes 7b. The plates 3a interact with the field associated to the capacitors 10 and affect the capacitance thereof.

Figure 3:
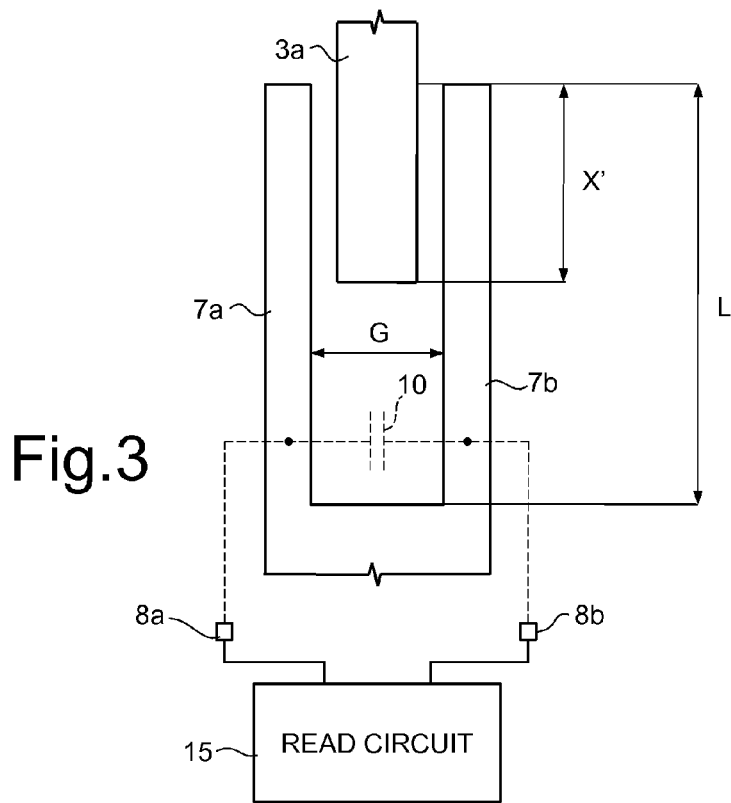
FIG. 3 is a simplified block diagram of a part of the microelectromechanical sensor of FIG. 1.

The overall capacitance of each capacitor 10 is determined by two contributions, one due to the portion of air between the plates and one due to the presence of the non-conductive material forming the plates 3a (see FIG. 3). If we denote by L the dimension of the electrodes 7a, 7b in the direction of the sensing axis X, by X' the length of the portion of the plates 3a inserted between the electrodes 7a, 7b, by Z (FIG. 2) the dimension of the electrodes 7a, 7b in the direction perpendicular to the surface 4a of the cavity 4 and to the sensing axis X, and by G the distance between adjacent first electrodes 7a and second electrodes 7b, the overall capacitance of each capacitor 10 is given by $$C = C_1 + C_2 = \varepsilon_0 \frac{(L-X')}{G} + \varepsilon_0 \varepsilon_r \frac{X'Z}{G} \quad (1)$$

The simplified relation (1) applies when the width of the plates 3a is substantially the same, but for a minor play, as the distance G between adjacent first electrodes 7a and second electrodes 7b and, moreover, if the effect of the plates 3a on the adjacent capacitors 10 is assumed to be negligible.

The overall capacitance of each capacitor 10 thus depends upon the position of the sensing mass along the axis X, which is, in turn, determined by the intensity of the forces applied to the supporting structure 2. If the structure of the sensor does not satisfy the conditions indicated, the capacitance of the capacitors 10 is given by a relation that is more complex than the relation (1), but depends in any case in a substantially linear way upon the position of the sensing mass along the axis X.

The total capacitance of the capacitors 10 (which are connected together in parallel, FIG. 1) can be easily detected with a read circuit 15, as shown in FIG. 3. In particular, the read circuit 15, for example, applies a voltage $V_S$ across the sensing terminals 8a, 8b and determines the integral of the current absorbed.

Figure 4:
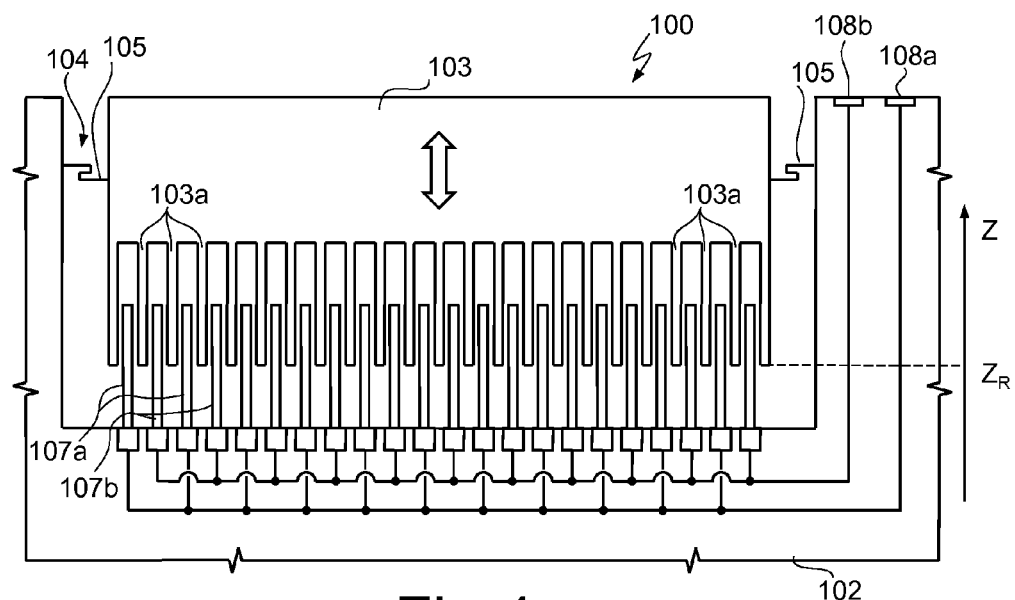
FIG. 4 is a cross section through a microelectromechanical sensor according to a second embodiment of the present disclosure.

FIG. 4 shows a different embodiment of the disclosure. A microelectromechanical sensor 100, in particular a monoaxial accelerometer, comprises a supporting structure 102 and a sensing mass 103, housed in a cavity 104 of the supporting structure 102 and movable with respect to the supporting structure 102 according to a degree of freedom, which in the embodiment described, is of a translatory type.

In greater detail, the sensing mass 103 is constrained to the supporting structure 102 through elastic connection elements 105, which are configured so as to enable relative movements of the sensing mass 103 along a sensing axis Z, with respect to a resting position. In the embodiment described, the sensing axis Z is perpendicular to a bottom surface 104a of the cavity 104 in which the sensing mass 103 is housed. Consequently, the degree of freedom enables the sensing mass 103 to move in a direction perpendicular to the surface 104a and hence to approach and recede with respect to the supporting structure 102.

The supporting structure 102 has a plurality of first electrodes 107a and second electrodes 107b made of doped semiconductor material (and hence conductive). The first electrodes 107a and the second electrodes 107b are perpendicular to the surface 104a of the cavity 104, are arranged facing one another and alternated, and project towards the sensing mass 103 in a direction parallel to the sensing axis Z.

The first electrodes 107a and the second electrodes 107b are arranged facing one another and are evenly spaced apart. Moreover, adjacent first electrodes 107a and second electrodes 107b are electrically isolated from one another and define respective capacitors with plane and parallel faces. A first sensing terminal 108a and a second sensing terminal 108b are connected, respectively, to the first electrodes 107a and to the second electrodes 107b.

The movable mass 103, which is made of non-conductive material, in particular intrinsic silicon, is movable along the sensing axis Z in a direction perpendicular to the surface 104a of the cavity 104. The sensing mass 103 has moreover plates 103a that project towards the first electrodes 107a and the second electrodes 107b parallel to the sensing axis Z. The plates 103a are arranged at a uniform distance apart and are inserted each between a respective pair of adjacent first electrodes 107a and second electrodes 107b.

The elastic connection elements 105 are configured so that, in the absence of external stresses, the sensing mass 103 is in a resting position $Z_R$ with respect to the sensing axis Z, as shown in FIG. 4. When a force is applied to the supporting structure 102, the sensing mass 103 moves along the sensing axis Z with respect to the resting position $Z_R$ perpendicular to the surface 104a, in a direction determined by the sign of the stresses. The amplitude of the displacement is moreover determined by the amount of the stresses.

Consequently, the space comprised between pairs of adjacent first electrodes 107a and second electrodes 107b is occupied by a respective plate 103a of the sensing mass 103 to an extent that depends upon the position of the sensing mass 103 itself.

Adjacent first electrodes 107a and second electrodes 107b define capacitors 10, the capacitance of which is determined, amongst other things, by the extent of the portion of the plates 103a inserted between adjacent first electrodes 107a and second electrodes 107b and, consequently, upon the position of the sensing mass 103 with respect to the sensing axis Z.

Figure 5:
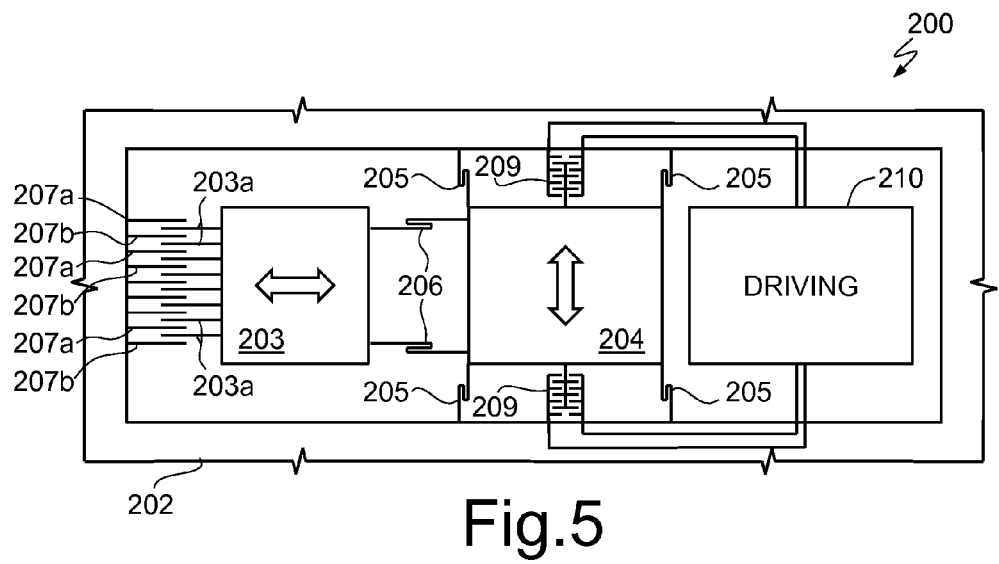
FIG. 5 is a simplified top plan view of a microelectromechanical sensor according to a third embodiment of the present disclosure.

In the embodiment illustrated schematically in FIG. 5, a gyroscope 200 comprises a supporting structure 202, a sensing mass 203, and a driving mass 204. The sensing mass 203 and the driving mass 204 are movable with respect to the supporting structure 202 according to respective degrees of freedom, which in this case are translatory. More precisely, the driving mass 204 is constrained to the supporting structure 202 through first elastic connection elements 205, which enable displacements of the driving mass 204 along a driving axis Y. The sensing mass 203 is constrained to the driving mass 204 through second elastic connection elements 206, which enable displacements of the sensing mass 203 with respect to the driving mass 204 along a sensing axis X perpendicular to the driving axis Y.

A driving device 210 keeps the driving mass 204 in oscillation with controlled amplitude and frequency, using for the purpose driving assemblies 209, which comprise fixed electrodes (anchored to the supporting structure 202) and movable electrodes (anchored to the driving mass 204) in a combfingered configuration.

The sensing mass 203 is made of non-conductive material, preferably intrinsic silicon, and comprises plates 203a arranged facing one another, which extend parallel to the sensing axis X.

First fixed electrodes 207a and second fixed electrodes 207b extend from the supporting structure parallel to the sensing axis X. The first fixed electrodes 207a and the second fixed electrodes 207b are arranged facing one another and alternated. Moreover, the adjacent first electrodes 207a and second electrodes 207b are electrically isolated and form capacitors in pairs.

The sensing mass 203 is arranged so that the plates 203a are located between respective pairs of first electrodes 207a and second electrodes 207b, substantially as already described with reference to FIGS. 1-3.

Rotations of the supporting structure about an axis perpendicular to the driving axis Y cause displacements of the sensing mass 203 along the sensing axis X as a result of the Coriolis force. The displacements are proportional to the angular velocity of the supporting structure and in turn determine capacitive variations of the capacitors defined between pairs of adjacent first electrodes 207a and second electrodes 207b. Reading of said capacitive variations hence supplies signals indicating the angular velocity of the supporting structure 202.

The disclosure affords several advantages, both from the constructional standpoint and as regards performance.

The use of a non-conductive material based upon semiconductor (such as an intrinsic semiconductor, silicon oxide or silicon nitride) instead of a polymer to provide the sensing mass enables exploitation of the usual micromachining techniques to obtain articulated structures, for example as the ones described with combfingered movable plates with fixed electrodes. The integration of polymeric structures, in fact, is frequently problematic, and the micromachining techniques do not enable comparable levels of precision to be achieved.

The possibility of providing complex and articulated structures significantly reflects also on the performance. The introduction of non-conductive material to a variable extent within the plates of capacitors enables substantial modification of the capacitances of the capacitors themselves. The resulting modifications go well beyond the influence on the edge effect due to setting, alongside the capacitors, dielectric structures, which intercept the lines of field only outside of the plates. The sensitivity of the sensors is hence considerably increased.

Figure 6:
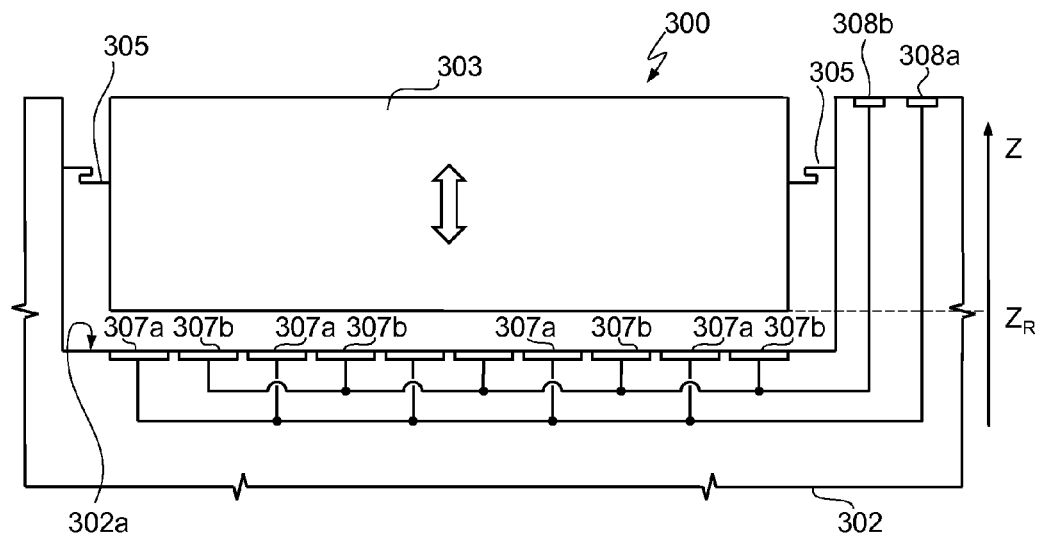
FIG. 6 is a cross-sectional view through a microelectromechanical sensor according to a fourth embodiment of the present disclosure.

The sensitivity also benefits from the dependence of the material used upon the dielectric constant, which can be very high, in particular with respect to that of polymers that can be used. The increase in sensitivity due to the choice of the material is consequently independent of the configuration chosen for the sensing mass. An advantage, albeit less marked, would anyway be obtainable also in the case of a movable sensing mass in the vicinity of a capacitor, but arranged on the outside without being introduced between the plates, as in the embodiment of FIG. 6. In this case, in a microelectromechanical sensor 300 a sensing mass 303 is elastically connected to a supporting structure 302 through elastic connection elements 305. In particular, the elastic connection elements 305 are configured to enable the sensing mass 303 to approach and recede alternately with respect to a surface 302a of the supporting structure 302 on which first electrodes 307a and second electrodes 307b are provided. The first electrodes 307a and second electrodes 307b are arranged aligned and alternate with one another. Moreover, adjacent first electrodes 307a and second electrodes 307b are electrically isolated and form capacitors. A first sensing terminal 308a and a second sensing terminal 308b are connected, respectively, to the first electrodes 307a and to the second electrodes 307b. In the presence of a sensing voltage $V_S$ between the first sensing terminal 308a and the second sensing terminal 308b, between the first electrodes 307a and the second electrodes 307b an electric field is set up, which is affected by the sensing mass 303 to an extent that is determined by the position of the sensing mass 303 itself with respect to the surface 302a of the supporting structure 302.

A further advantage of the solutions described, in which the sensing mass has plates inserted between pairs of fixed electrodes to a variable extent according to the position of the sensing mass itself, is the high linearity on a wide range of measurements. The relation that links the overall capacitance of the capacitors to the amplitude of the portion of the plates of the sensing mass that is located within the plates of the capacitors in fact applies with good approximation until the plates of the sensing mass are almost altogether extracted.

In addition, the devices provided according to the disclosure do not suffer of the so-called "pull-in" phenomenon to which sensors that use conductive movable electrodes, in particular in a combfingered configuration, are, instead, subject. The movable electrodes are in fact subjected to electrostatic forces that tend to recall the movable electrodes themselves into the space within the fixed electrodes. Normally, the electrostatic forces are countered by the elastic force of the connection elements, which tend to bring the sensing mass and the movable electrodes back into the resting position. If, however, the displacements exceed a threshold, for example on account of an intense stress, the electrostatic forces, which depend in a non-linear way upon the position of the sensing mass, prevail. The sensing mass is blocked and does not return to the resting position, preventing operation of the device. The sensing mass according to the disclosure is, instead, made of non-conductive material and is hence immune from the pull-in phenomenon because the plates are not subject to voltage.

Figure 7:
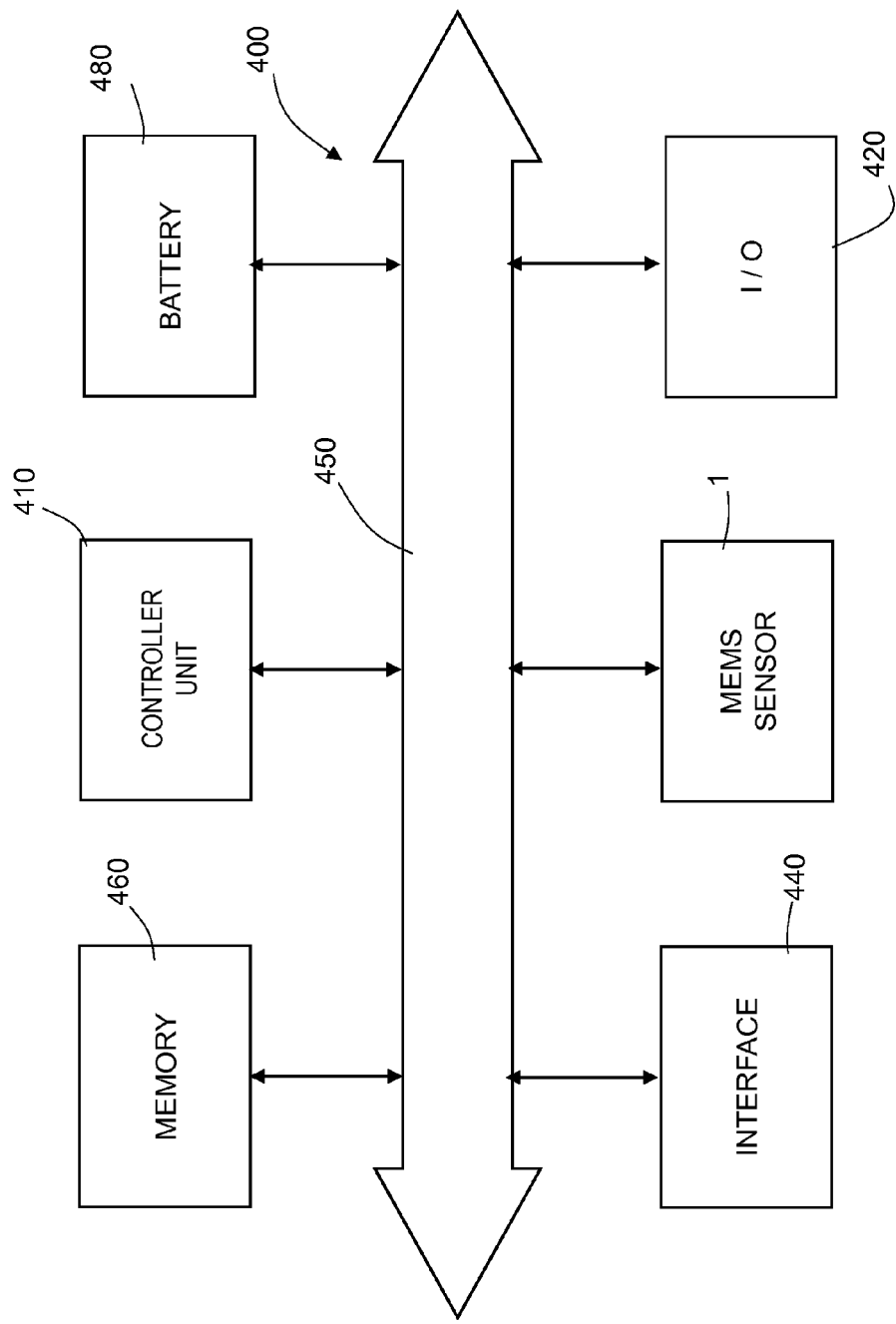
FIG. 7 is a simplified block diagram of an electronic system incorporating a microelectromechanical sensor according to one embodiment of the present disclosure.

FIG. 7 illustrates a portion of an electronic system 400 according to one embodiment of the present disclosure. The system 400 incorporates the microelectromechanical device 1 and can be used in electronic systems, such as, for example, a palmtop computer (personal digital assistant, PDA), a portable computer, possibly with wireless capacity, a cellphone, a messaging device, a digital audio player, a digital photographic camera or video camera, an inertial navigation system, an automotive system, or other devices designed to process, store, transmit, or receive information. For example, the microelectromechanical device 1 can be used in a digital camera for detecting movements and carry out an image stabilization. In a further embodiment, the microelectromechanical device 1 is included in a user interface activated by motion for computers or consoles for videogames. In a further embodiment, the microelectromechanical device 1 is incorporated in a satellite-navigation device and is used for temporary tracking of position in the case of loss of the satellite-positioning signal.

The electronic system 400 can comprise a controller 410, an input/output (I/O) device 420 (for example, a keyboard or a screen), the microelectromechanical device 1, a wireless interface 440, and a memory 460, of a volatile or nonvolatile type, coupled to one another through a bus 450. In one embodiment, a battery 480 can be used for supplying the system 400. The scope of the present disclosure is not limited to embodiments having necessarily one or all of the devices listed.

The controller 410 can comprise, for example, one or more microprocessors, microcontrollers, and the like.

The I/O device 420 can be used for generating a message. The system 400 can use the wireless interface 440 for transmitting and receiving messages to and from a wireless communication network with a radio-frequency (RF) signal. Examples of wireless interface can comprise an antenna, a wireless transceiver, such as a dipole antenna, even though the scope of the present disclosure is not limited from this standpoint. In addition, the I/O device 420 can supply a voltage representing what is stored either in the form of digital output (if digital information has been stored) or in the form of analog output (if analog information has been stored).

Finally, it is clear that modifications and variations may be made to the microelectromechanical sensor described and illustrated herein, without thereby departing from the sphere of protection of the present disclosure.

In particular, the disclosure can be used to obtain also other types of devices, such as, for example, multiaxial accelerometers and gyroscopes and electro-acoustic transducers, and magnetometers. In addition, rotational accelerometers and gyroscopes with angularly oscillating driving mass may be obtained.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical sensor comprising:
  a supporting structure having a capacitor that includes:
    a first fixed electrode; and
    a second fixed electrode spaced apart from and capacitively coupled to the first fixed electrode; and
  a non-conductive mobile mass with a non-conductive extension positioned between the first and second fixed electrodes, the extension arranged to interact with an electric field associated with the capacitor and movable with respect to the supporting structure according to a degree of freedom, a relative position of the mobile mass with respect to the first fixed electrode and to the second fixed electrode being variable in response to an external stress.

2. The sensor according to claim 1, wherein a non-conductive material of the extension is selected from the group consisting of intrinsic semiconductor materials, oxides of semiconductor materials, and nitrides of semiconductor materials.

3. The sensor according to claim 1, wherein a non-conductive material of the extension is selected from the group consisting of intrinsic silicon, intrinsic germanium, and intrinsic gallium arsenide.

4. The sensor according to claim 1, wherein the extension includes a plate positioned between the first electrode and the second electrode to an extent that depends on the relative position of the mobile mass with respect to the first electrode and to the second electrode according to the degree of freedom.

5. The sensor according to claim 4, wherein the supporting structure includes a base, a plurality of additional first electrodes, and a plurality of additional second electrodes arranged facing one another and alternated and extending from the base of the supporting structure towards the mobile mass;

adjacent first electrodes and second electrodes are electrically isolated from one another; and the mobile mass has a plurality of non-conductive extensions that are plates positioned between respective pairs of the first electrodes and second electrodes to an extent which is determined by the relative position of the mobile mass with respect to the first electrodes and to the second electrodes.

6. The sensor according to claim 5, wherein the adjacent first electrodes and second electrodes define respective parallel plate capacitors.

7. The sensor according to claim 5, wherein the mobile mass is movable parallel to a surface of the supporting structure facing the mobile mass.

8. The sensor according to claim 7, wherein the plurality of plates of the mobile mass extend laterally from the mobile mass toward the supporting structure.

9. The sensor according to claim 5, wherein the mobile mass is movable perpendicularly to a surface of the supporting structure facing the mobile mass.

10. The sensor according to claim 9, wherein the plates of the mobile mass are arranged between the mobile mass and a side surface of the supporting structure facing the mobile mass.

11. The sensor according to claim 10, wherein the adjacent first electrodes and second electrodes extend from the side surface of the supporting structure toward the mobile mass.

12. An electronic system, comprising:
a control unit; and
a microelectromechanical sensor coupled to the control unit, the sensor including:
a substrate;
a supporting structure coupled to the substrate, the supporting structure having a capacitor, the capacitor being formed by:
a first fixed electrode extending from the supporting structure over the substrate; and
a second fixed electrode extending from the supporting structure over the substrate and spaced apart from and being capacitively coupled to the first fixed electrode; and
a movable mass suspended over the substrate and configured to interact with the first and second fixed electrodes of the supporting structure, the movable mass being formed of a non-conductive material and having a non-conductive protrusion that extends from the movable mass towards the supporting structure and extends between the first fixed electrode and the second fixed electrode.

13. The system of claim 12, wherein the protrusion is configured to interact with an electric field generated by the capacitor and is configured to move with respect to the supporting structure according to a degree of freedom, a relative position of the movable mass with respect to the first electrode and to the second electrode being variable in response to an external stress.

14. The system of claim 12, wherein the non-conductive material of the protrusion is selected from the group consisting of intrinsic semiconductor materials, oxides of semiconductor materials, and nitrides of semiconductor materials.

15. The system of claim 12, further comprising:
a driving mass coupled to the movable mass by elastic connection elements, the driving mass being configured to move with respect to the supporting structure along a first axis and the moveable mass being configured to move in response to displacements of the driving mass along a second axis that is perpendicular to the first axis.

16. The system of claim 15, further comprising:
a driving device coupled to the driving mass and configured to oscillate the driving mass.

17. A method, comprising:
sensing with a microelectromechanical sensor, the sensing comprising:
forming a capacitor and generating a capacitance between a first fixed electrode and a second fixed electrode extending from a supporting structure over a substrate;
determining a change in the capacitance in response to a movement of a non-conductive movable mass having a non-conductive extension positioned between the first and second fixed electrodes, the extension configured to interact with an electric field of the capacitor, the non-conductive mass being configured to move with respect to the capacitor according to a degree of freedom, a relative position of the non-conductive mass with respect to the capacitor being variable in response to an external stress.

18. The method according to claim 17, wherein the extension is made of a material selected from the group consisting of intrinsic semiconductor materials, oxides of semiconductor materials, and nitrides of semiconductor materials.

19. The method according to claim 17, wherein the first fixed electrode and the second fixed electrode are elongated extensions facing each other and wherein the extension extends between the first fixed electrode and the second fixed electrode.

20. The method according to claim 17, wherein the sensing includes:
oscillating a driving mass that is coupled to the moveable mass with elastic connections, the driving mass being configured to move along a first axis and being configured to move the movable mass along a second axis perpendicular to the first axis.

21. The method according to claim 17, wherein the determining includes applying a voltage across sensing terminals that are coupled to the first fixed electrode and the second fixed electrode, respectively.

22. A micro-electromechanical sensor, comprising:
a supporting structure having a capacitor that includes:
a first fixed electrode; and
a second fixed electrode spaced apart from and capacitively coupled to the first fixed electrode; and
a non-conductive mobile mass moveable with respect to the supporting structure according to a degree of freedom, the mobile mass including a non-conductive portion that extends between the first and second fixed electrodes.

23. The sensor of claim 22, wherein a non-conductive material of the portion is selected from the group consisting of intrinsic semiconductor materials, oxides of semiconductor materials, and nitrides of semiconductor materials.

24. The sensor of claim 22, further comprising:
a driving mass coupled to the movable mass by elastic connection elements, the driving mass being configured to move with respect to the supporting structure along a first axis and the moveable mass being configured to move in response to displacements of the driving mass along a second axis that is perpendicular to the first axis.

* * * * *